United States Patent

Splawinski

[15] 3,695,375
[45] Oct. 3, 1972

[54] MULTI-PURPOSE VEHICLE
[72] Inventor: Thaddeus M. Splawinski, 10 Sullivan St., Saskatoon, Saskatchewan, Canada
[22] Filed: Nov. 30, 1970
[21] Appl. No.: 93,520

[52] U.S. Cl. ..................... 180/29, 115/1 R, 180/74, 280/208
[51] Int. Cl. ............................................ B62d 61/00
[58] Field of Search ............ 180/21, 10, 29; 280/208; 301/5 R; 115/1 R, 19

[56] References Cited

UNITED STATES PATENTS

| | | |
|---|---|---|
| 2,812,031 | 11/1957 | Aghnides.................180/29 |
| 2,998,996 | 9/1961 | Aghnides................301/5 R |
| 3,424,259 | 1/1969 | Aghnides.................180/29 |
| 2,372,043 | 3/1945 | Aghnides.................180/21 |
| 1,357,571 | 11/1920 | Knepper..................180/10 |

FOREIGN PATENTS OR APPLICATIONS

| | | |
|---|---|---|
| 1,226,447 | 10/1966 | Germany..................180/29 |

*Primary Examiner*—Gerald M. Forlenza
*Assistant Examiner*—Frank E. Werner
*Attorney*—Kent & Ade

[57] ABSTRACT

A pair of semi-spherical hollow wheels are mounted for rotation to a body with the axes of rotation being at an angle to the horizontal so that the peripheries of the two wheels are substantially together at the underside of the body. Power is transmitted from the body through an axle to each wheel, said axle carrying a friction roller engaging a circular track on the inside of each wheel.

1 Claim, 7 Drawing Figures

INVENTOR.
THADDEUS M. SPLAWINSKI
BY
Kent v Ade

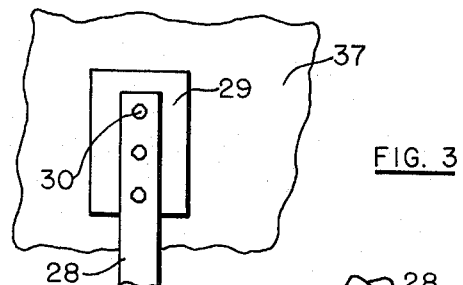
FIG. 3
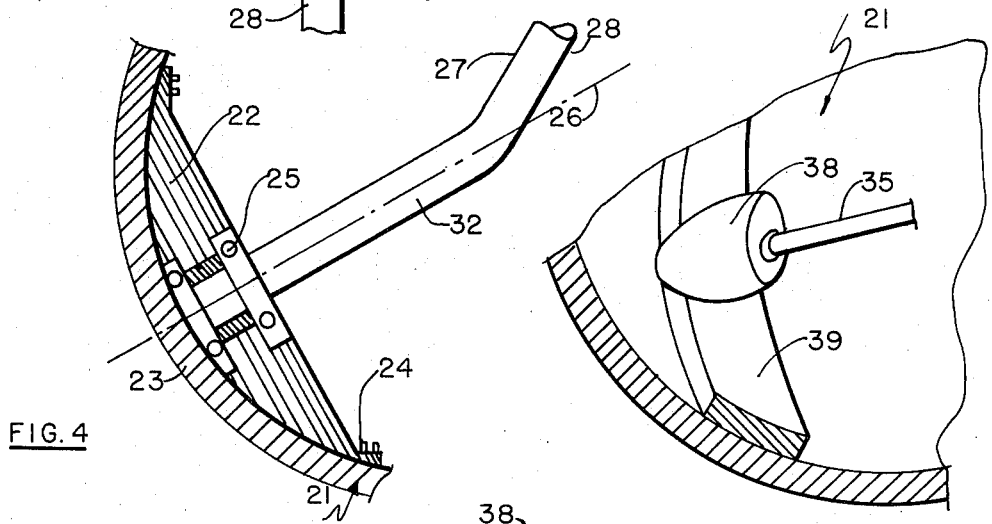
FIG. 4
FIG. 5
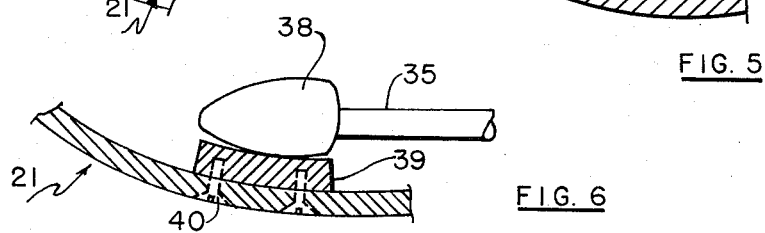
FIG. 6
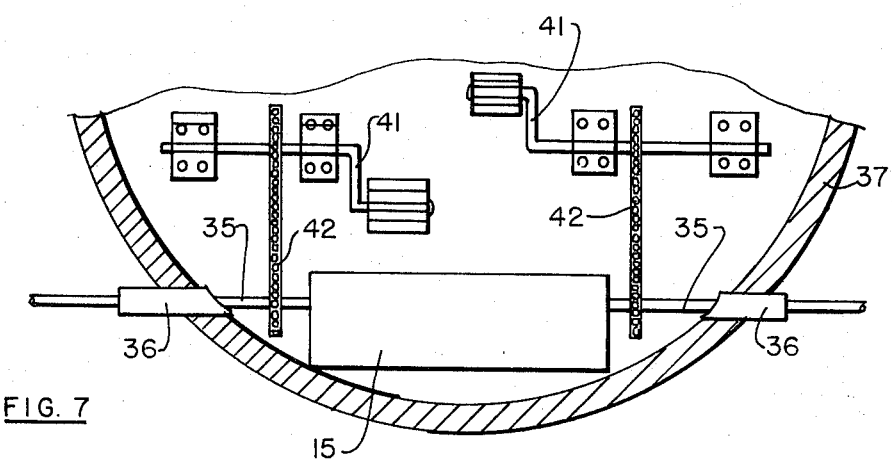
FIG. 7
INVENTOR.
Thaddeus M. Splawinski
BY
Kent & Ade

MULTI-PURPOSE VEHICLE

This invention relates to new and useful improvements in vehicles designed and constructed so as to enable the transportation of passengers and cargo across virtually any terrain. The device can be adapted to travel over water, snow, muskeg, roads and across country. It can be designed and constructed to be powered manually or by a mechanical source of power.

It can be used as a means of transportation, for sports and recreation, and is readily adapted for use in a miniature size as a propulsive toy for children.

The spherical design of the body can be made to accommodate any number of passengers and cargo and the mounting of the wheels is such that it is virtually impossible to overturn the vehicle.

The principal object and essence of the invention is to provide a substantially spherical body partially encapsulated by a pair of hollow, semi-spherical wheels attached at an angle so that the point of rolling contact is spaced from the periphery of the wheels.

Another object of the invention is to provide a device of the character herewithin described which can be used for commercial or recreational purposes or, alternatively, is readily adapted for use as a toy for children.

Another object of the invention is to provide a device of the character herewithin described which can be manually powered or, alternatively, can be provided with a source of mechanical or electrical power.

A yet further object of the invention is to provide a device of the character herewithin described which offers very little frictional resistance when travelling on a flat, hard surface but increases the wheel contact area as the surface deteriorates to a softer consistency such as going from ice to snow and the like.

A yet further object of the invention is to provide a device of the character herewithin described which is simple in construction, economical in manufacture, and otherwise well suited to the purpose for which it is designed.

With the foregoing in view, and such other or further purposes, advantages or novel features as may become apparent from consideration of this disclosure and specification, the present invention consists of, and is hereby claimed to reside in, the inventive concept which is comprised, embodied, embraced, or included in the method, process, construction, composition, arrangement or combination of parts, or new use of any of the foregoing, of which concept, one or more specific embodiments of same are herein exemplified as illustrative only of such concept, reference being had to the accompanying Figures in which:

FIG. 3 is an enlarged fragmentary front elevation of the method of attaching the axle to the body.

FIG. 4 is a fragmentary partially sectioned view showing the attachment of the axle to the wheel.

FIG. 5 is a fragmentary isometric view showing the method of propulsion.

FIG. 6 is a view similar to FIG. 5 but taken on a cross section.

FIG. 7 is a fragmentary cross sectional view of the interior of the body showing the source of propulsion.

In the drawings like characters of reference indicate corresponding parts in the different figures.

Proceeding therefore to describe the invention in detail, reference should be made to the drawings in which 10 illustrates a substantially spherical body preferably made from a transparent material such as plastic and being provided with a hinged door 11 in the front thereof operated by catch 12.

Figure 2:
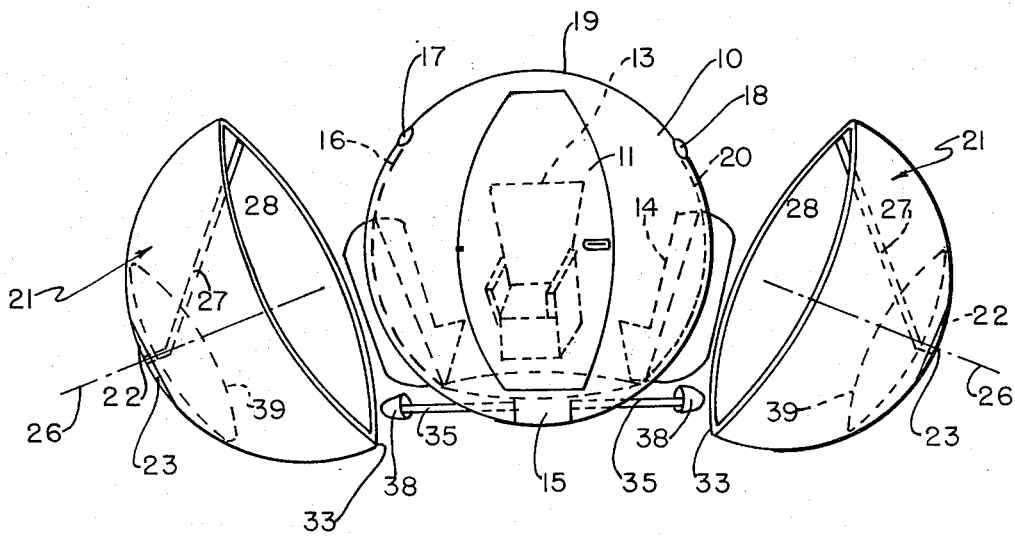
FIG. 2 is a view similar to FIG. 1 but with the wheels detached from the body portion.

Within the body and shown in phantom in FIG. 2 may be seen the driver's seat 13 and a pair of passenger seats 14. However, it will be appreciated that the passenger seats and the driver's seat could be an annular seat extending around the interior of the body portion.

Because the device is designed for use on water, the door 11 should be in sealing contact with the door opening when the door is closed and if a mechanical source of power is used, then means to exhaust same are required.

A source of power 15 such as an internal combustion engine is shown schematically in FIG. 7 and an exhaust pipe 16 extends from the source of power to an exhaust vent 17 towards the upper side of the body portion. This is shown in FIG. 2.

By the same token an air intake 18 is required and once again this is located on the upper side 19 of the body, with a duct 20 extending downwardly towards the source of power.

Figure 1:
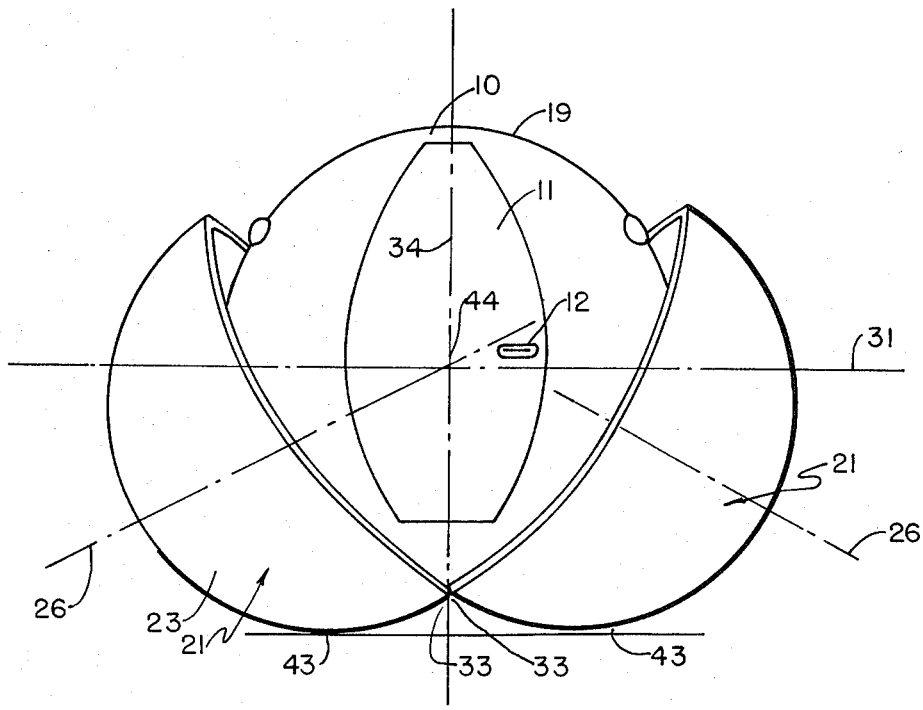
FIG. 1 is a front elevation of the device.

Wheels collectively designated 21 are provided upon each side of the body portion and these wheels take the form of substantially hollow, semi-spherical components which, when mounted to the body portion, partially encapsulate or enclose the body portion as clearly shown in FIG. 1.

A reinforcing plate or block 22 (FIG. 4) is secured around the crown portion 23 of each wheel 21 by means of bolts 24 and thrust roller bearings 25 are provided within this reinforcing plate substantially around the central axis 26 of each wheel.

Axles 27 is provided to mount the wheels to the body portion, each axle including an attaching portion 28 which is secured to a reinforcing plate 29 on the body portion, by means of bolts 30. This attachment is above the horizontal axis 31 of the body portion and the axle portion 28 extends downwardly and outwardly from the point of attachment.

A wheel mounting portion 32 is angulated outwardly from the distal end of the attaching portion 28 and this portion 32 is engaged within the bearings 25 hereinbefore described.

The angulation of the axle mounts the wheels for rotation so that the lower runs 33 of the peripheries of the wheels are substantially in contact with one another below the body portion and substantially on the vertical axis thereof, said vertical axis being indicated by reference character 34.

The aforementioned source of propulsion 15, may be electric or mechanical with drive shafts 35, one upon each side thereof, said shafts passing through bearings 36 within the wall 37 of the body portion 10. Cone shaped rollers 38 are secured to the ends of shafts 35 and engage circular tracks 39 secured to the body portion around the crown area 23 but spaced from the reinforcing plate 22. These tracks may be secured within the hollow, semi-spherical wheels 21 by various means but screws 40 are shown in FIG. 6.

The rollers 38 engages the tracks 39 frictionally and rotate the wheels thus propelling the vehicle.

Alternatively, pedal assemblies 41 may be provided within the vehicle reachable by the operator, said pedal assemblies being connected to the shafts 35 by means of chain and sprocket drives 42.

In operation, the source of propulsion rotates the wheels through the frictional engagement of the rollers 38 with the tracks 39. The point of contact 43 of the wheels is shown in FIG. 1, assuming a hard surface is being traversed.

However the spherical configuration of the wheels together with the angle of inclination of the mounting thereof enables these points of contact to be anywhere from the peripheries 33 of the lower run thereof to the spherical axis 26 thus maintaining the center of gravity of the body portion below the spherical axes.

This makes the vehicle virtually impossible to overturn despite the terrain.

Furthermore the point of contact 43 is near zero on a hard, flat surface to an exceedingly wide area of contact on the outer circumference of the wheel in soft surfaces such as snow.

Should the surface cause the vehicle to ride on one wheel surface beyond the spherical axis, the vehicle will swing around this wheel and position itself in an upright position.

It will readily be appreciated that the wheel construction will also enable the operator to go ahead or reverse on either one or both wheels alternatively or simultaneously thus enabling a 360° turn or a portion thereof to be made without forward travel taking place.

Needless to say conventional controls are provided (not illustrated) connected between the operator's location and the source of power for such maneuverability.

It should also be observed from FIG. 1 that the horizontal axis 31 of the body portion, the vertical axis 34 of the body portion and the spherical axes 26 of the wheels 21 intersect at location 44.

Various modifications can be made within the scope of the inventive concept which is herein disclosed and/or claimed.

What I claim as my invention is:

1. A vehicle comprising a spherical body, a pair of hollow semispherical wheels disposed at opposite sides of said body and constituting sole supporting means therefor, said wheels having inwardly and upwardly slanted axes of rotation which intersect each other at the center of the spherical body, peripheral edges of said wheels having a point of contact with each other centrally below the body, the hollow wheels enclosing segmental portions of the body primarily at the opposite lower sides thereof and the spherical body existing wholly within the confines of said hollow wheels in the direction of travel of the vehicle, and propulsion means in the body operatively connected to said wheels for rotating the same.

* * * * *